3,845,008
BRAKE LINING COMPOSITION COMPRISING PARTICULATE TAR RESIDUE
Andrew Mitchell III, Newark, Del., assignor to E. I. du Pont de Nemours and Company, Wilmington, Del.
No Drawing. Filed Mar. 2, 1973, Ser. No. 337,681
Int. Cl. C08g 51/08, 51/10, 51/12
U.S. Cl. 260—37 R                                6 Claims

ABSTRACT OF THE DISCLOSURE

A high friction article for use in brake linings and related areas comprises a heat resistant fibrous filler such as asbestos, a binder to hold the mass together such as a phenolic resin and a unique friction modifier which comprises a tar residue recovered from the production of organic isocyanates by the phosgenation of the corresponding diamine in an inert solvent, which tar having been solvent extracted to remove any excess oils. Other elements may be added to the high friction composition. They include rubbery modifiers for impact strength, graphite for use as a lubricant, barytes for use as a filler and metallic powders for use as a heat dissipation. The resulting high friction composition is particularly valuable as a molded brake lining composition.

BACKGROUND OF THE INVENTION

High friction articles have been used in the past extensively as automotive brake linings. Such brake linings generally fall into two primary classifications, molded and woven. In the former case asbestos fibers or fibers which have equivalent characteristics with regard to strength, body and frictional resistance are usually dry mixed with stabilizing, abrasive and heat conducting compounds or fillers together with a binder. Woven linings are generally made by weaving the long fiber asbestos with a minor amount of cotton carrier yarn, streaked through with strands of metals such as copper, bronze or others which are well known in the art. The usual additives are indicated above. The various elements and the manufacture of the brake linings, both molded and woven, are well known in the art and need not be elaborated in this application.

Generally, the asbestos fibers serve to add strength, body and friction resistance to the lining. The binder is typically a phenolic resin serves to bind the mixture together. Elastomers such as butadiene-acrylonitrile copolymers may also serve to improve impact strength. Various other materials may be added such as: lubricants, which may be wet, e.g. lead or dry, e.g. graphite or molybdenum disulfide, for decrease in wear; fillers, e.g. barytes, for friction augmentation and/or low cost bulk; friction-augmenting agents or modifiers which change the friction characteristics, e.g. Cardolite which is a product of the Minnesto Mining and Manufacturing Company produced from cashew nut shells and anacardic acid. Additionally, scavengers may be added to scrape congealed binder from the mating member.

The friction modifiers have presented somewhat of a problem in that there is a tendency, under extreme braking conditions, for most of these materials to burn. The burning will lower the coefficient of friction between the brake lining and the contacting metal drum and may result in a decrease in braking capacity during severe braking operations which is referred to as "brake fade." Additionally, many of the materials used as modifiers are quite expensive.

Thus, there is a definite need for a material which will char, instead of burn, during severe braking operations so that brake fade may be avoided. It would be of course preferable if such a material were relatively inexpensive in price and readily available.

SUMMARY OF THE INVENTION

According to this invention it has unexpectedly been discovered that the solvent-extracted residue from the manufacture of organic isocyanates by the phosgenation of the corresponding aromatic amine is an excellent modifier for a brake lining material since it serves to substantially increase the desired friction characteristics of the brake lining material and will char rather than burn under extreme braking conditions. The residue is composed of the following: highly polymerized and cross-linked tar residue from the preparation of toluene diisocyanate by phosgenation process known in the art.

The composition of the tar residues as well as the method for making them is taught in U.S. Pat. 2,889,257 entitled "Distillation of Tar Residues," the disclosure of which is herein incorporated by reference.

The total composition of the brake lining material may be as follows:

1. A fibrous filler which comprises about 30 to 70% by weight, such friction modifier may be asbestos, preferably chrysotile asbestos alone or in combination with glass.

2. The composition also comprises from 10 to 50%, preferably 20 to 30% of a binder material. These binders are not critical and may include the phenolic resins alone or in combination with natural or synthetic rubber. Alternatively, other binders may be utilized such as the aromatic polyamides or polyimides disclosed in U.S. Pat. Nos. 3,179,631 and 3,249,588.

3. A friction modifier, as indicated above, in the amount of 1 to 20% by weight, preferably 6 to 12% by weight.

4. A lubricant may be added to the brake lining composition in the amount of about 0 to 20% by weight. This would include the wet or dry lubricants.

5. Filler in the amount of 0 to 10%, preferably ground barytes, may also be added to the brake lining composition.

6. A scavenger in the amount of 0 to 10% by weight.

The several elements indicated above are molded together by conventional techniques known in the art. Typically molding will take place at a temperature of about 300–450° F. and a pressure between about 3000–4000 p.s.i. for 15–30 minutes. Needless to say, this is not critical and may be varied as required according to the constituents. After molding the product is usually annealed for several hours at gradually increasing temperature, for example two hours each at 250° F., 275° F., 300° F., 325° F. and 350° F. It has a coefficient of friction of between above .3 at 150–200° C. and a wear index of at least 30. The wear index is the quotient of the coefficient of friction and wear (g. wt. loss) $\times$ 100.

Methods for manufacturing brake linings are found in the Kirk-Othmer Encyclopendia of Chemical Technology, Second Edition, Vol. 10, pp. 130–134. These pages and the references cited therein are herein incorporated by reference.

DETAILED DESCRIPTION OF THE INVENTION

In more detail, the instant invention relates to molded brake lining compositions which have high softening point, thermal stability and decompose by charring rather than melting. The fibrous fillers suitable for compositions of the instant invention include short chrysotile asbestos fibers, on a 3 to 7 scale the 7 fibers are the shortest, and fibrous materials such as potassium titanate. Needless to say, asbestos is much preferred and functions efficiently as a fibrous filler which is heat resistant. The fibrous particles of asbestos also serve to hold the mixture together; the fibrous particles, amount to about 30 to 70% by weight of the total mixture, preferably 40 to 60% by weight.

Additionally, it is essential that the composition of the instant invention contain the highly cross-linked tar residue from the manufacture of organic isocyanates. The method for obtaining such residues is discussed in detail in the previously mentioned U.S. Pat. 2,889,257. In the interest of brevity, a brief description of the process will be included herein. Initially, aromatic amines are phosgenated to produce organic isocycanates. Excess phosgene and hydrogen chloride are recovered from the reaction by a flashing operation or blowing with an inert gas. A major portion of the organic isocyanate is removed by distillation from non-distillable residues. The isocyanates produced by this process include monoisocyanates such as phenyl isocyanate, naphthyl isocyanate and hexylisocyanate and polyisocyanates such as 2,4- and 2,6-toluene diisocyanate, 4,4' - diisocyanato - 3,3' - dimethyldiphenylmethane, 4,4'-diisocyanato diphenylmethane and toluene 2,2,4,6-trisocyanates.

The non-volatile tar residue, after the distillation, is introduced into a naphthenic hydrocarbon oil solvent and held at a temperature of from 200–315° C., and from 1 to 80 millimeters of mercury pressure whereby the remaining organic isocyanate, is for the most part vaporized. The insoluble residue is converted to a readily filterable granular solid in the oil and is recovered by filtration.

This recovered tar is oily and as such is not a desirable component of a brake lining composite; it must therefore be deoiled. Consequently, the tar must be solvent extracted to remove the oil. Any of the well known solvents which have been previously utilized to extract hydrocarbon oil from solids may be utilized; they include ortho- di-chlorobenzene, carbon tetrachloride, toluene, xylenes, hexane, etc. Substantially no more than about 1% by weight of oil should remain in the tar residue when it is added to the brake lining composition.

It is preferred to utilize a tar which is produced in the manufacture of 2,4- and for 2,6-toluenediisocyanate (hereinafter referred to as TDI) since such a tar is readily available for commercial operations to produce these compounds.

The deoiled TDI tar residue is then added to the asbestos containing prake lining composition. It is added in the amount of about 5 to 20 weight percent, preferably 6 to 12 weight percent; this may be described as a minor amount. The residue material is in the form of particle having an average size of about 26–80 mesh.

The binder material is preferably a phenolic resin which may be liquid and most preferably a phenol-formaldehyde resin. Such resins are well known in the art and may be found in the literature prepared by companies selling brake linings such as Raybestos-Manhattan Company Inc., Inland Division of General Motors Company, Johns-Manville, Inc., Thermoid Inc. and the Brake Lining Manufacturers Association, Inc. A discussion of phenolic resins such as resorcinol-formaldehyde resin is to be found in the book "Asbestos With Plastics and Rubber"— Bergen and Oesben 1966, pages 71–75. Those pages and patents cited therein such as U.S. Pat. 2,633,433 and U.S. Pat. 2,638,428, Swiss Patent 277,318, British Patent 658,- 269 etc. are herein incorporated by reference. Other suitable resins which may be utilized include the polyimide resins described in U.S. Pats., 3,179,631 and 3,249,588. It should be noted that any suitable resin for use as a binder may be included since the particular resin be it a polyimide or a phenolic resin such as resorcinol-formaldehyde resin, is not a critical aspect of the invention. The invention resides in the unexpected finding that the tar residues from the production of polyisocyanates, after solvent extraction, gives an excellent friction material for use in brake linings.

A rubber additive, e.g. butadiene-acrylonitrile to improve impact resistance, may also be added, but this is optional.

The lubricants may be present in the amount of 0 to 20 weight percent, preferably 0 to 10 weight percent. Graphite and molybdenum disulfide are dry lubricants and lead is the wet lubricant. Wet lubricants melt below the temperature attained during use of the friction element. Wet lubricants may lower friction; in general, the lubricants protect both the lining and matting from wear and scuffing.

The fillers may be present in the amount of 0 to 20 weight percent, preferably 0 to 10 usually serve as inert bulk but may also augment friction. Barites and rotten stone are the most commonly used fillers.

The scavenger may be present in the amount of 0 to 10 weight percent. The scraping function of the scavenger is achieved with 40-mesh brass chip or other abrasive material.

The components of the mixture are intimately blended together by tumbling or mixing the dry finely divided ingredients in standard powder blenders, such as conical or ribbon blenders. Alternatively, they may be dissolved or suspended in an inert carrier liquid and stirred together, after which the liquid is removed by evaporation.

After comingling of the elements of the brake lining composition they are shaped into the desired form in a suitable compression mold at a temperature of about 300 to 450° F., and a pressure of 3000 to 4000 p.s.i.g. for a period of several hours.

The resulting composition has a coefficient of friction of above about 0.3 and usually from about 0.4 to 0.8 and a wear constant of at least 30.

In the following examples all parts and percentages are by weight.

Example

The particular tar residue obtained from the process described in detail in U.S. Pat. 2,889,251 was washed with orthodichlorobenzene to remove the remainder of naphthenic hydrocarbon oil, filtered, dried and classified by standard screening into three portions having particle size (A) 20–40 mesh; (B) 40–80 mesh; (C) greater than 80 mesh. Portions of these samples were tumbled-blended with the other ingredients shown in Table I, and 50 gram portions of the three mixtures were compression molded into 0.5" x 2.0" diameter cylinders in a plunger compression mold held at 310° F. and closed with a plating pressure of 10,000 lbs. (ca. 3000 p.s.i. on sample). The sample cylinders were then cured further in an air oven for two hours at each of 250° F., 275° F. 300° F., 325° F., and 350° F.

After cooling, the cylindrical blank is machined into test specimens. The test specimens are in the form of a disk, ⅛" thick and 1.120–1.25" in diameter. The disks are center drilled to form a 9⁄32" hole. One surface of the disk is recessed by machining out a core with a diameter of 1.000–1.005 to a depth of 1⁄16" to provide a circular test surface of nominal 0.120" width (area of 0.2 in.²).

The test specimen is mounted on a variable speed, vertical spindle in such a way that the test surface is in contact with a cast iron ¼" thick wear plate having a ring shape, an inside diameter of 15⁄16" and an outside diameter of 1¼" and having a lapped surface. The wear plate has a 600 G SiC finish. The flat surfaces of both the test specimen and the wear plate are parallel and in the same plane. The wear plate is thermally insulated from its holder and is connected to a strain gage through a lever arm. A force sufficient to produce a load of 9.5 pounds on the nominal area of contact of 0.20 in.² is applied through a lever arm to the test specimen. The spindle is rotated at 600 r.p.m. A thermocouple is inserted through the central cavity of the wear plate into a hole just below the surface of the wear plate to measure the temperature developed in the wear plate.

The temperature and the tangential force shown on the strain gauge are recorded and the coefficient of friction at various temperatures calculated by dividing the tangential force by the applied load (i.e. 9.5 lbs.) The test is continued for ten minutes, the weight loss of the sample is determined and a Friction/Wear Index is calculated by dividing the average coefficient of friction by the sample weight loss in grams. This Index gives an indication of the relative efficiency and durability of the friction materials with higher numbers indicating the more desirable material.

recovering a tar residue including at least a portion of the aromatic diisocyanate, introducing the tar into a naphthenic hydrocarbon oil solvent at elevated temperature wherein the aromatic diisocyanate dissolves and solid tar particles remain, filtering and recovering the solid tar particles and then deoiling the tar particles so that substantially all the hydrocarbon oil is removed.

3. The composition of claim 1 wherein tar residue is derived from the production of 2,4 TDI and/or 2,6 TDI or mixtures thereof.

4. The composition of claim 1 wherein the composition contains 0 to 20% by weight of a lubricant.

TABLE I

| Composition (parts by weight): | | | | | | |
|---|---|---|---|---|---|---|
| Isocyanate residue: | | | | | | |
| A | 8 | | | 12 | | |
| B | | 8 | | | 12 | |
| C | | | 8 | | | 12 |
| Asbestos fiber | 50 | 50 | 50 | 50 | 50 | 50 |
| Barytes | 20 | 20 | 20 | 20 | 20 | 20 |
| Phenolic resin* | 20 | 20 | 20 | 20 | 20 | 20 |
| Graphite | 2 | 2 | 2 | 2 | 2 | 2 |
| Properties: | | | | | | |
| Max. average coefficient of friction | .41 | .44 | .65 | .47 | .44 | .63 |
| Coefficient friction at—150–200° C | .40 | .41 | .34 | .42 | .37 | .50 |
| 200–250° C | .44 | .54 | .57 | .51 | .58 | .68 |
| Sample wt. loss/10 min. (g.) | .0080 | .0124 | .0180 | .0116 | .0139 | .0107 |
| Friction/wear index | 51 | 35 | 36 | 41 | 32 | 59 |
| Fade temp. (° C.) | 215 | 280 | 350 | 275 | -------- | 205 |

* Durez 14,000, Hooker Chemical Co.

What is claimed is:

1. A molded brake lining composition having a coefficient friction of at least about 0.3 comprising about 30 to 70 weight percent of asbestos, about 10 to 50 weight percent of a synthetic resin binder, and about 1 to 20 weight percent of a particulate friction modifier which comprises a deoiled highly polymerized tar residue from the production of organic isocyanates by the phosgenation of aromatic diamines said residue containing a maximum of one percent by weight hydrocarbon oil and having a particle size of about 20–80 mesh.

2. The composition of claim 1 wherein the residue is recovered in the following fashion, phosgenating an aromatic diamine to form the corresponding aromatic diisocyanate, distilling the product of the phosgenation and 5. The composition of claim 4 wherein the composition contains 0 to 10% by weight of a filler.

6. The composition of claim 5 wherein said filler is ground barytes.

References Cited

UNITED STATES PATENTS

| 678,139 | 7/1901 | Spear | 106—36 |
| 1,761,057 | 6/1930 | Thompson | 106—36 |
| 2,453,188 | 11/1948 | Blume et al. | 106—36 |

ALLAN LIEBERMAN, Primary Examiner

U.S. Cl. X.R.

188—250 R; 260—37 N, 38